United States Patent
Yang et al.

(10) Patent No.: US 9,350,686 B2
(45) Date of Patent: May 24, 2016

(54) DATA ACCESS DEVICE AND METHOD FOR COMMUNICATION SYSTEM

(75) Inventors: Kuo-Nan Yang, Hsinchu (TW);
Chia-Hua Hsu, Hsinchu (TW);
Fong-Ray Gu, Kaohsiung County (TW);
Yen-Hsu Shih, Changhua County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 1768 days.

(21) Appl. No.: 12/466,753

(22) Filed: May 15, 2009

(65) Prior Publication Data

US 2009/0292836 A1    Nov. 26, 2009

(30) Foreign Application Priority Data

May 21, 2008  (TW) .............................. 97118673 A

(51) Int. Cl.
*G06F 13/14* (2006.01)
*H04L 12/879* (2013.01)
*H04L 12/861* (2013.01)

(52) U.S. Cl.
CPC .............. *H04L 49/901* (2013.01); *H04L 49/90* (2013.01); *H04L 49/9073* (2013.01)

(58) Field of Classification Search
None
See application file for complete search history.

(56) References Cited

U.S. PATENT DOCUMENTS

| | | | |
|---|---|---|---|
| 4,590,467 A | 5/1986 | Lare | 370/462 |
| 4,593,281 A | 6/1986 | Lare | 370/462 |
| 4,672,570 A | 6/1987 | Benken | 709/250 |
| 4,860,193 A | 8/1989 | Bentley et al. | 710/55 |
| 4,907,225 A | 3/1990 | Gulick et al. | 370/463 |
| 4,945,548 A | 7/1990 | Iannarone et al. | 375/214 |
| 4,969,164 A | 11/1990 | Mehta et al. | 377/41 |
| 5,048,012 A | 9/1991 | Gulick et al. | 370/498 |
| 5,103,446 A | 4/1992 | Fischer | 370/236 |
| 5,142,782 A | 9/1992 | Martucci | 29/890.144 |
| 5,210,749 A | 5/1993 | Firoozmand | 370/463 |
| 5,249,271 A | 9/1993 | Hopkinson et al. | 710/57 |
| 5,293,487 A | 3/1994 | Russo et al. | 709/250 |
| 5,307,345 A | 4/1994 | Lozowick et al. | 370/428 |
| 5,390,299 A | 2/1995 | Rege et al. | 709/234 |
| 5,434,872 A | 7/1995 | Petersen et al. | 714/811 |
| 5,488,724 A | 1/1996 | Firoozmand | 709/212 |
| 5,732,094 A | 3/1998 | Petersen et al. | 714/805 |
| 6,032,180 A * | 2/2000 | Nishikawa | H04N 7/17318 348/E5.008 |
| 6,389,489 B1 | 5/2002 | Stone et al. | |
| 7,477,649 B2 * | 1/2009 | Paulson | G06F 5/12 370/412 |
| 2002/0178310 A1* | 11/2002 | Nozaki | G06F 13/385 710/240 |
| 2004/0013123 A1 | 1/2004 | Paulson et al. | |

* cited by examiner

*Primary Examiner* — Ilwoo Park
(74) *Attorney, Agent, or Firm* — McClure, Qualey & Rodack, LLP

(57) ABSTRACT

A data access device for a communication system includes: a write controller controlled by the host and outputting a write pointer; a read controller controlled by the write pointer and outputting a read pointer; a download timing controller comparing the write and read pointers to determine a timing of downloading data from the host, and including a pointer difference calculator and a comparator, the pointer difference calculator calculating a distance between the write and read pointers to obtain a pointer difference, the comparator outputting a download status indication according to the pointer difference and a first predetermined length to provide a basis for changing the write pointer; and a transmit buffer downloading data from the host according to the write pointer and transmitting data to the network interface according to the read pointer. A data access device for a network interface controller and a data access method are also disclosed.

6 Claims, 6 Drawing Sheets

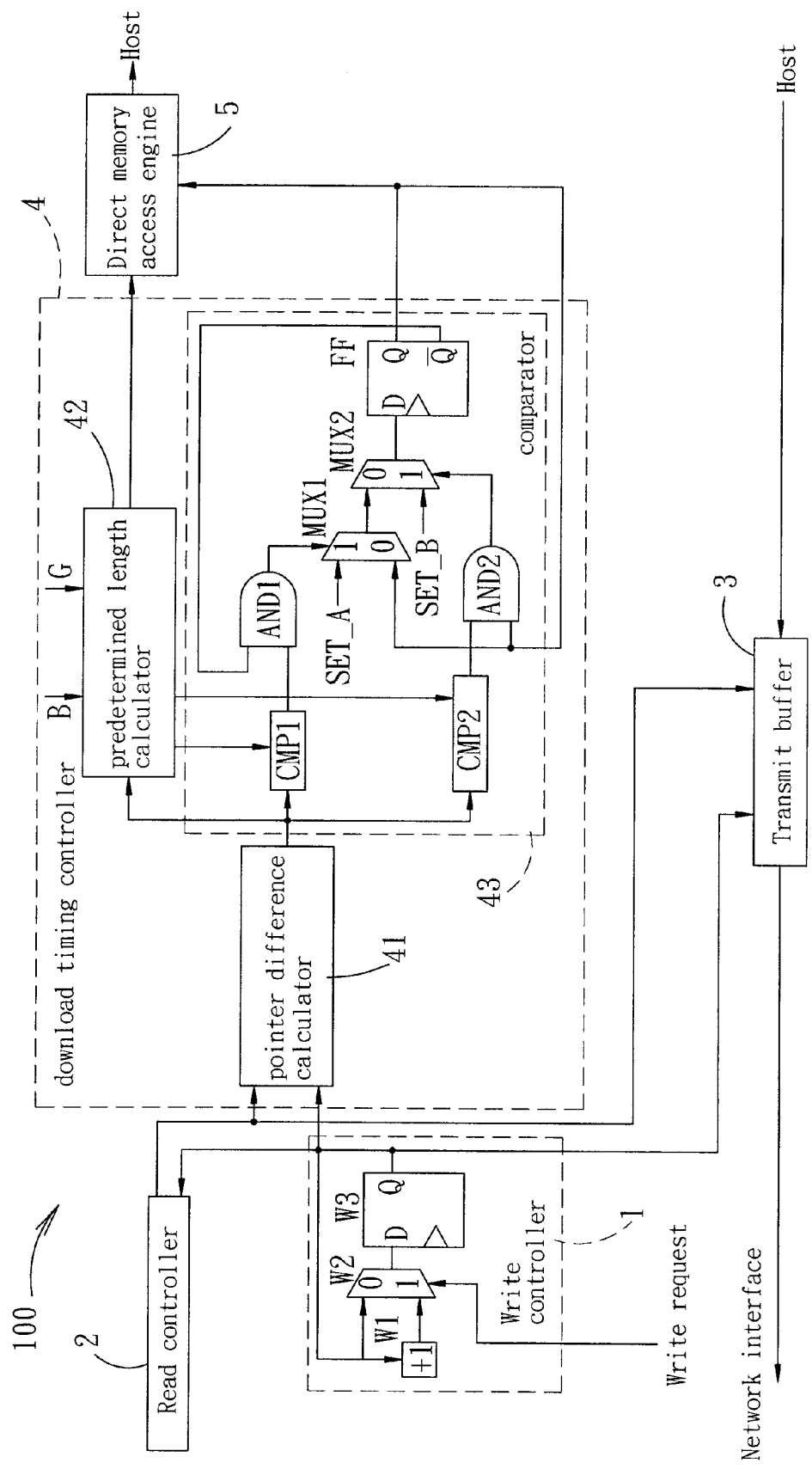
F I G. 2

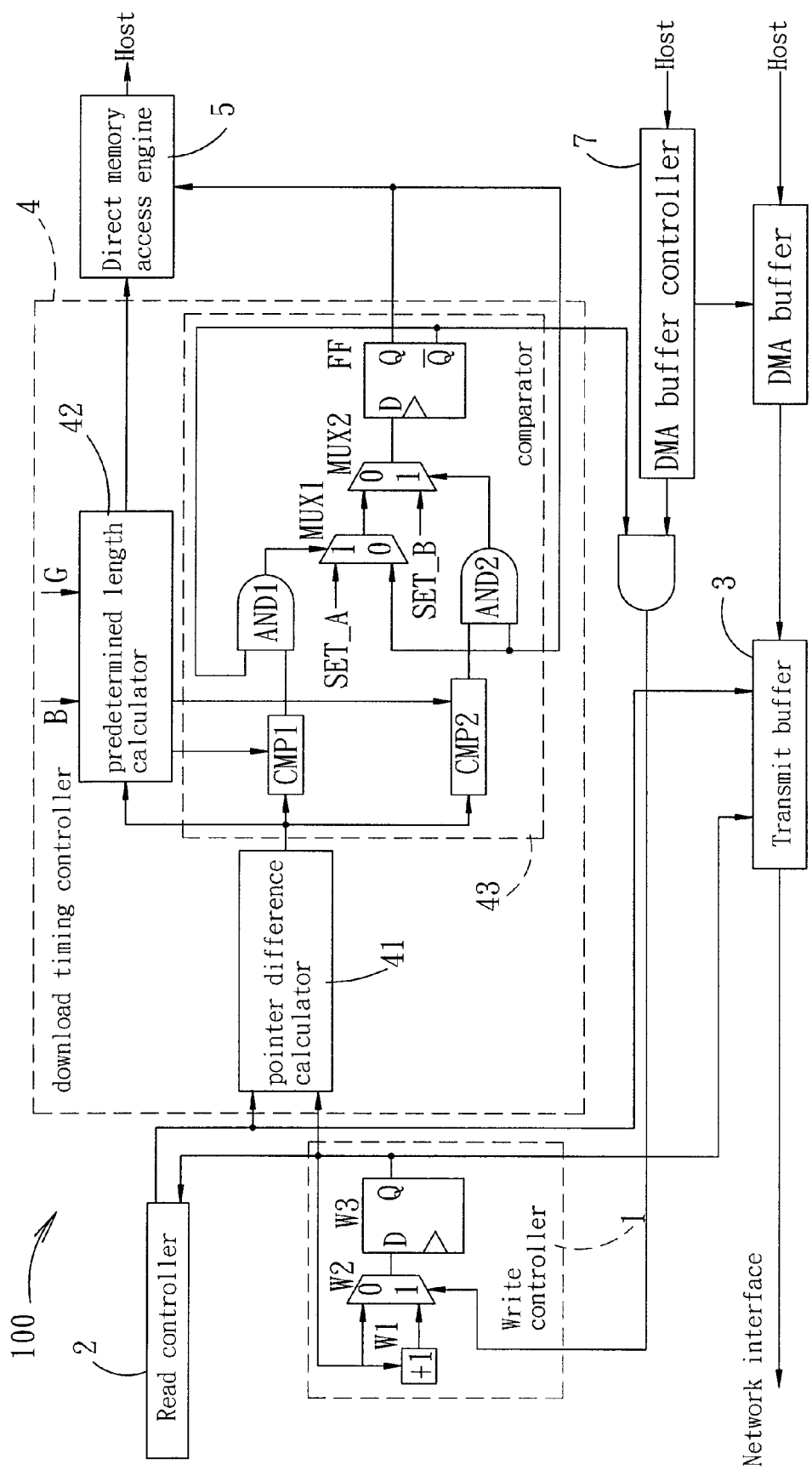
F I G. 5

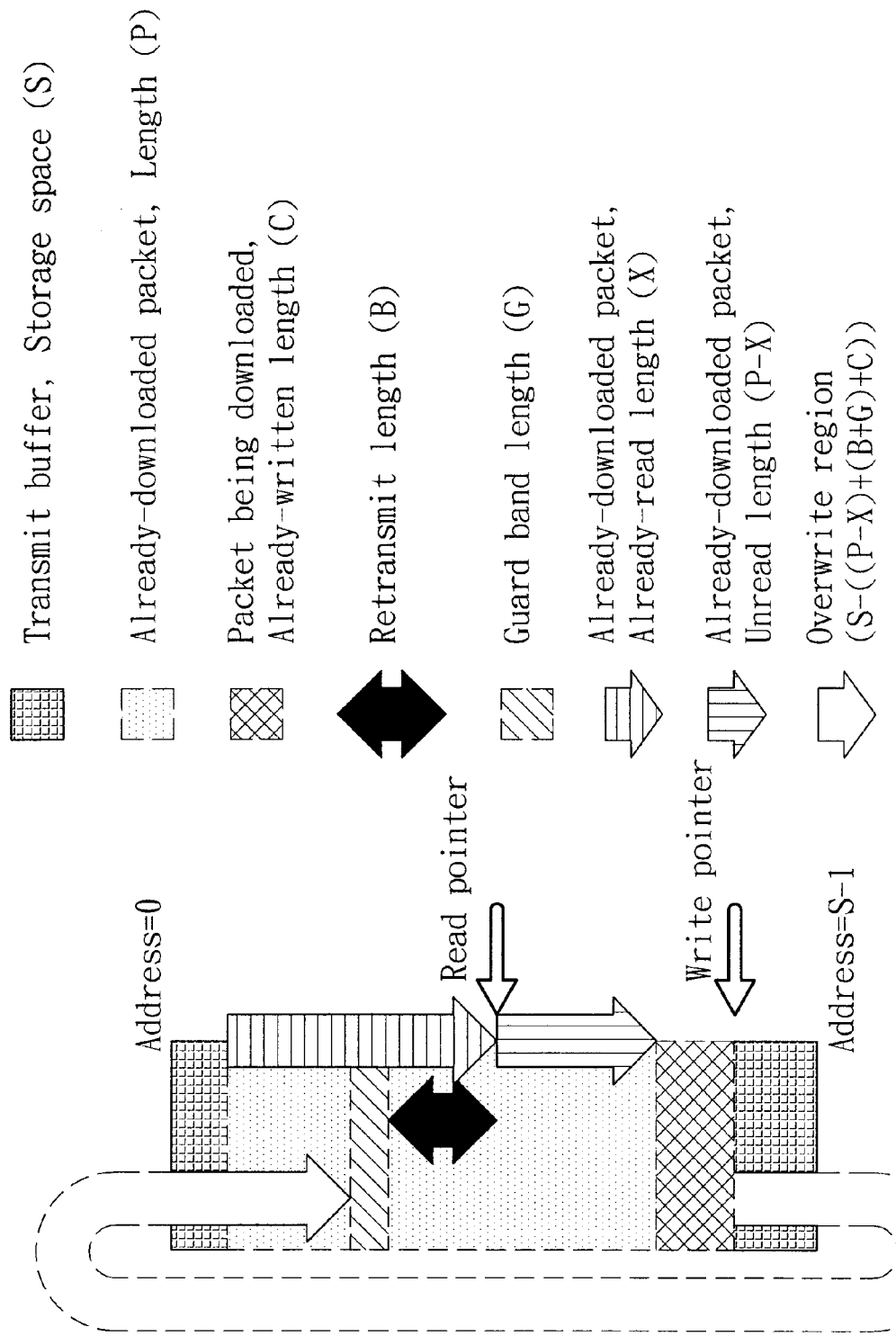
F I G. 6

DATA ACCESS DEVICE AND METHOD FOR COMMUNICATION SYSTEM

CROSS-REFERENCE TO RELATED APPLICATION

This application claims priority of Taiwanese Application No. 097118673, filed on May 21, 2008.

BACKGROUND OF THE INVENTION

1. Field of the Invention

The present invention relates to a data access device and method, more particularly to a data access device and method for a communication system.

2. Description of the Related Art

In a conventional network communication system, a host transmits data in a main memory thereof to a network through a network interface controller (NIC). Since the NIC must temporarily store the data from the host before transmitting the same to the network, the NIC includes a transmit buffer.

The conventional NIC divides the transmit buffer included therein into one or a plurality of pages, and each page stores a network frame packet downloaded from the main memory of the host. When the transmit buffer includes a single page, the page stores all downloaded packet data, and a packet is transmitted to the network only after the packet has been fully stored in the page. Hence, good throughput is not realized through such a technique. When the transmit buffer includes two pages, one of the pages is used to store downloaded data, and a packet already stored in the other page is transmitted. Although throughput is increased when more than one page is used in this manner, the buffer must have a larger storage space when such a configuration is used.

Regardless of whether the transmit buffer is configured to include a single or multiple pages, transmission of a packet to the network is not initiated until after the packet has been completely downloaded. This is due to the fact that the network transmission process is a continuous operation. Hence, if transmission of a packet is started before the NIC has completely downloaded the packet, when the network transmission data rate is higher than the rate at which the NIC downloads data from the host, the storage data of the transmit buffer may be read empty, such that the transmission process is interrupted.

U.S. Pat. No. 5,434,872 discloses a method that provides for the early initiation of data transmission in a network interface. Alternative techniques are needed that allow for the transmission of data without first waiting until a packet is completely downloaded.

SUMMARY OF THE INVENTION

Therefore, an object of this invention is to provide a data access device and method for a communication system, and a data access device for a network interface controller that do not require a large storage space for a transmit buffer and that are able to realize good throughput.

According to one aspect of this invention, the data access device for a communication system downloads data from a host and transmits data to a network interface. The data access device comprises: a write controller being controlled by the host and outputting a write pointer; a read controller being controlled by the write pointer and outputting a read pointer; a download timing controller comparing the write pointer and the read pointer to determine a timing of downloading data from the host, the download timing controller including a pointer difference calculator and a comparator, the pointer difference calculator calculating a distance between the write pointer and the read pointer to obtain a pointer difference, the comparator outputting a download status indication according to the pointer difference and a first predetermined length in order to provide a basis for changing the write pointer; and a transmit buffer downloading data from the host according to the write pointer and transmitting data to the network interface according to the read pointer.

According to another aspect of this invention, the data access method for a communication system is implemented by a data access device including a transmit buffer, the transmit buffer downloading data according to a write pointer and transmitting data according to a read pointer. The data access method comprises: calculating a distance between the write pointer and the read pointer to obtain a pointer difference; generating a download status indication according to the pointer difference and a first predetermined length; and changing the write pointer according to the download status indication.

According to yet another aspect of this invention, the data access device for a network interface controller transmits data stored in a host to a network interface. The data access device comprises: a write controller determining a write pointer according to a control signal output by the host; a read controller determining a read pointer according to the write pointer; a download timing controller determining whether to receive data from the host according to the read pointer and the write pointer, the download timing controller including a pointer difference calculator calculating a distance between the write pointer and the read pointer to obtain a pointer difference, and a comparator outputting an indication according to the pointer difference and a predetermined length in order to instruct the data access device whether or not to receive data from the host; and a first-in-first-out (FIFO) buffer receiving data from the host according to the write pointer and transmitting data to the network interface according to the read pointer.

BRIEF DESCRIPTION OF THE DRAWINGS

Other features and advantages of the present invention will become apparent in the following detailed description of the preferred embodiments with reference to the accompanying drawings, of which:

FIG. 2 is a schematic circuit block diagram of the data access device for a communication system according to the preferred embodiment of the present invention;

FIG. 5 is a schematic circuit block diagram of a data access device for a communication system according to another preferred embodiment of the present invention; and FIG. 6 is a schematic diagram used to describe the relationship of a write pointer and a read pointer to a transmit buffer in the data access device according to the preferred embodiments of the present invention.

DETAILED DESCRIPTION OF THE PREFERRED EMBODIMENTS

Figure 1:
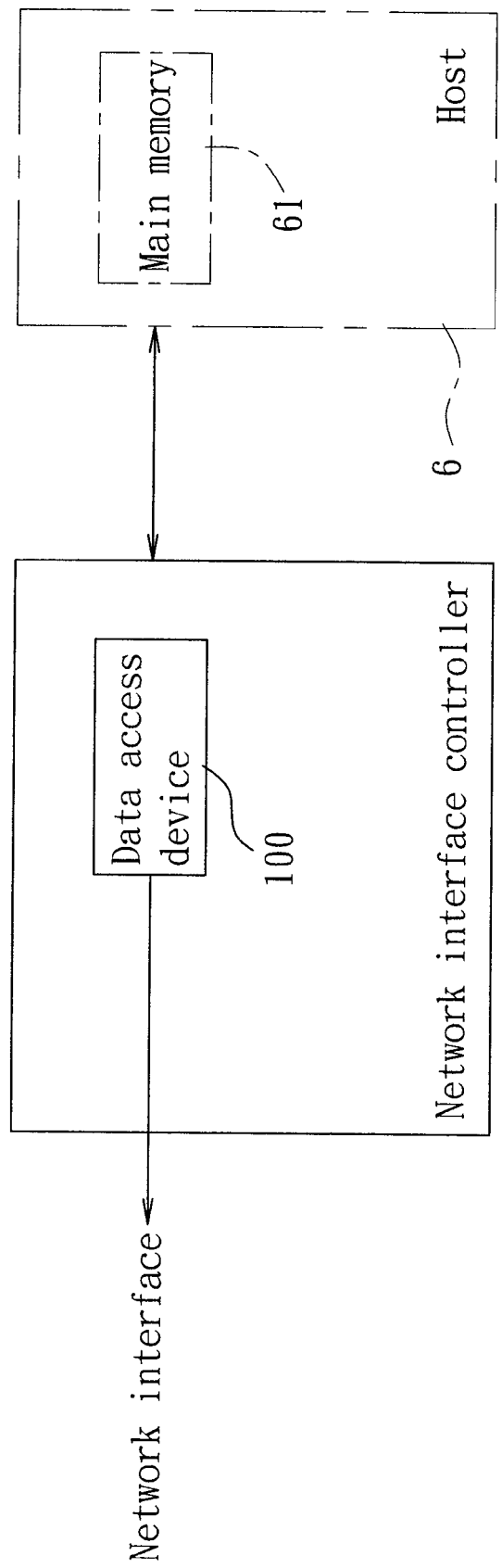
FIG. 1 is a schematic circuit block diagram of a host and a network interface controller, in which the network interface controller includes a data access device for a communication system according to a preferred embodiment of the present invention.

Before the present invention is described in greater detail, it should be noted that like elements are denoted by the same reference numerals throughout the disclosure.

Referring to FIGS. 1 and 2, a data access device 100 for a communication system according to a preferred embodiment of the present invention is integrated in an Ethernet network interface controller (NIC), and downloads packet data from a main memory 61 of a host 6 and transmits packet data to a network interface. However, the present invention is not limited to implementation in an Ethernet NIC and may find other applications.

The data access device 100 includes a write controller 1, a read controller 2, a transmit buffer (e.g., a first-in-first-out buffer) 3, a download timing controller 4, and a direct memory access (DMA) engine 5.

The write controller 1 is controlled by the host 6, and outputs a write pointer. In one embodiment, the write controller 1 determines the write pointer according to a control signal output by the host 6.

The read controller 2 is controlled by the write pointer, and outputs a read pointer. In one embodiment, the read controller 2 determines the read pointer according to the write pointer.

The download timing controller 4 compares the write pointer and the read pointer to determine a timing of downloading data from the host 6 (i.e., the download timing controller 4 determines whether to receive data from the host 6 according to the read pointer and the write pointer). The download timing controller 4 includes a pointer difference calculator 41, a predetermined length calculator 42, and a comparator 43.

The pointer difference calculator 41 calculates a distance between the write pointer and the read pointer to obtain a pointer difference.

The predetermined length calculator 42 outputs a first predetermined length, and further outputs a second predetermined length. In one embodiment, the predetermined length calculator 42 uses a predetermined retransmit length (B) as the first predetermined length. In another embodiment, the predetermined length calculator 42 adds the predetermined retransmit length (B) and a predetermined guard band length (G) to obtain the first predetermined length. The predetermined length calculator 42 obtains the second predetermined length by adding a predetermined threshold limit value to the first predetermined length. The first predetermined length may also be referred to as a "predetermined length," and the second predetermined length may also be referred to as a "predetermined length."

The comparator 43 outputs a download status indication according to the pointer difference and the first predetermined length in order to provide a basis for changing. The download status indication may also be referred to as an "indication," i.e., an indication that instructs the data access device 100 whether or not to receive data from the host 6.

In a state where the download status indication enables downloading, the comparator 43 switches the download status indication into a state that does not enable downloading if the pointer difference is not greater than the first predetermined length. Moreover, in the state where the download status indication does not enable downloading, the comparator 43 switches the download status indication into the state that enables downloading if the pointer difference is greater than the second predetermined length.

In some embodiments, only the first predetermined length is used for such switching control. In such embodiments, if the pointer difference is greater than the first predetermined length, the comparator 43 switches the download status indication into the state for enabling downloading, and if the pointer difference is not greater than the first predetermined length, the comparator 43 switches the download status indication into the state that does not enable downloading.

The comparator 43 includes a first comparator (CMP1) a second comparator (CMP2), a first AND gate (AND1), a second AND gate (AND2), a first multiplexer (MUX1), a second multiplexer (MUX2), and a register (FF). The coupling among these elements is as shown in FIG. 2. It is to be noted that the present invention is not limited to the configuration of the comparator 43 shown in FIG. 2, and other designs may be employed that realize the same or similar logical operations. For example, the comparator 43 may be realized using a digital signal processor.

The first comparator (CMP1) compares the pointer difference and the first predetermined length, and outputs a first comparison result.

The register (FF) outputs the download status indication from output (Q), and a complementary status indication which is a complement of the download status indication from output ($\overline{Q}$).

The first AND gate (AND1) has as inputs the first comparison result of the first comparator (CMP1) and a previous complementary status indication from the register (FF).

The first multiplexer (MUX1) receives an output of the first AND gate (AND1) to select one of a predetermined first set value (SET_A) and a previous download status indication from the register (FF), and outputs a first selection result.

The second comparator (CMP2) compares the pointer difference and the second predetermined length, and outputs a second comparison result.

The second AND gate (AND2) has as inputs the second comparison result of the second comparator (CMP2) and the previous download status indication.

The second multiplexer (MUX2) receives an output of the second AND gate (AND2) to select one of a predetermined second set value (SET_B) and the first selection result of the first multiplexer (MUX1), and outputs a second selection result to the register (FF).

The transmit buffer 3 downloads data from the host 6 according to the write pointer, and transmit data to the network interface according to the read pointer.

The direct memory access engine 5 is controlled by the download status indication to output a write request to the write controller 1 via the host 6 so that the write controller 1 updates the write pointer.

When the data access device 100 first operates, the write pointer and the read pointer are the same, such that the transmit buffer 3 has the largest storable space. Therefore, the download status indication is set as 0, which indicates that downloading may be performed, and the complementary status indication is set as 1. Subsequently, during operation of the data access device 100, the transmit buffer 3 downloads packet data from the host 6 according to the write pointer, and transmits packet data to the network interface according to the read pointer.

Figure 3:
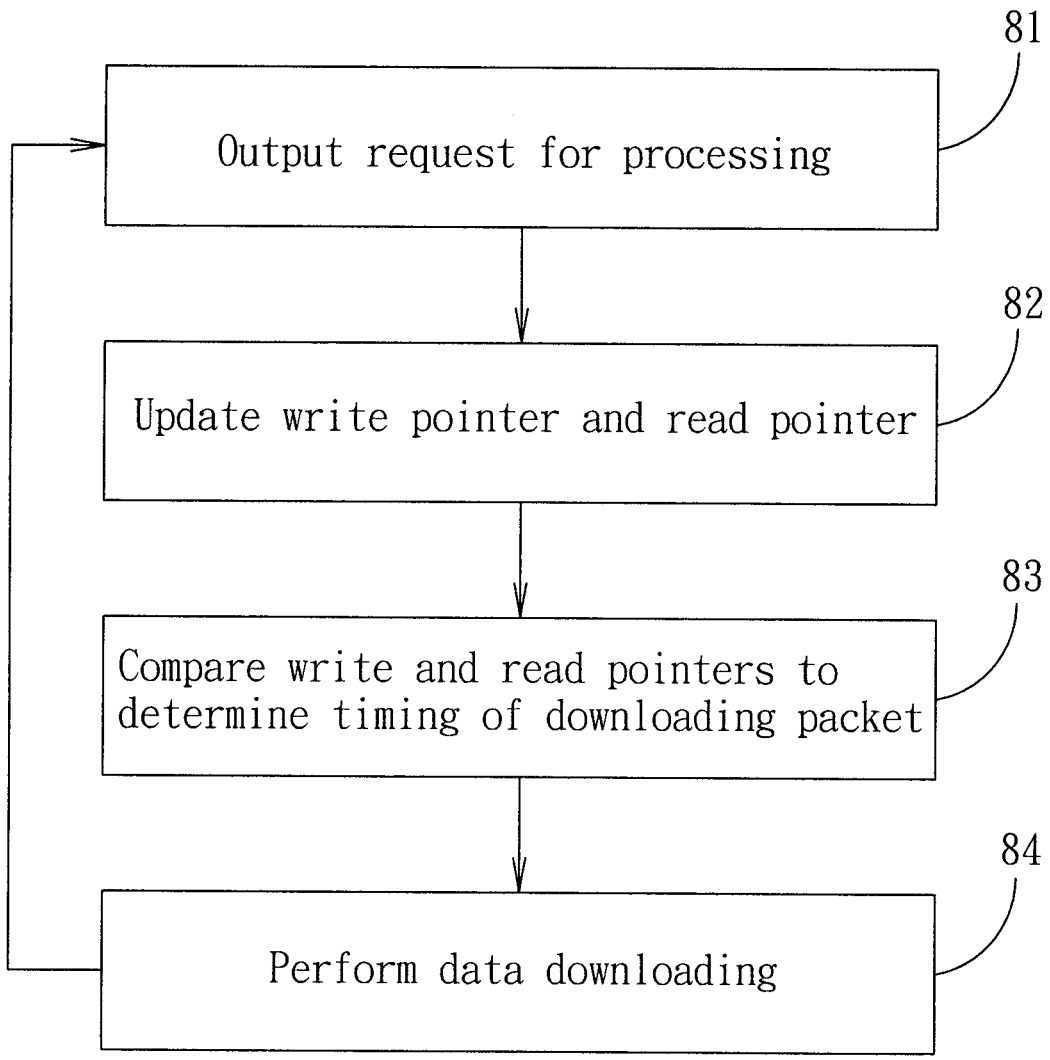
FIG. 3 is a flowchart of a data access method for a communication system according to a preferred embodiment of the present invention.

The data access device 100 of the present invention performs a data access method. A flowchart of a preferred embodiment of the data access method according to the present invention is shown in FIG. 3.

First, in step 81, the host 6 outputs a request for processing to the Ethernet NIC. The request has a plurality of prompts, and each prompt is used as a notification of a unit of packet data to be processed stored in the main memory 61 of the host 6. After the Ethernet NIC receives a prompt, the DMA engine 5 is caused to output an access data request to the host 6.

In step 82, the write controller 1 and the read controller 2 update the write pointer and the read pointer, respectively, and notify the download timing controller 4 of the updated pointers.

Next, in step 83, the download timing controller 4 compares the write pointer and the read pointer to determine the timing of downloading packet data from the main memory 61 of the host 6.

Figure 4:
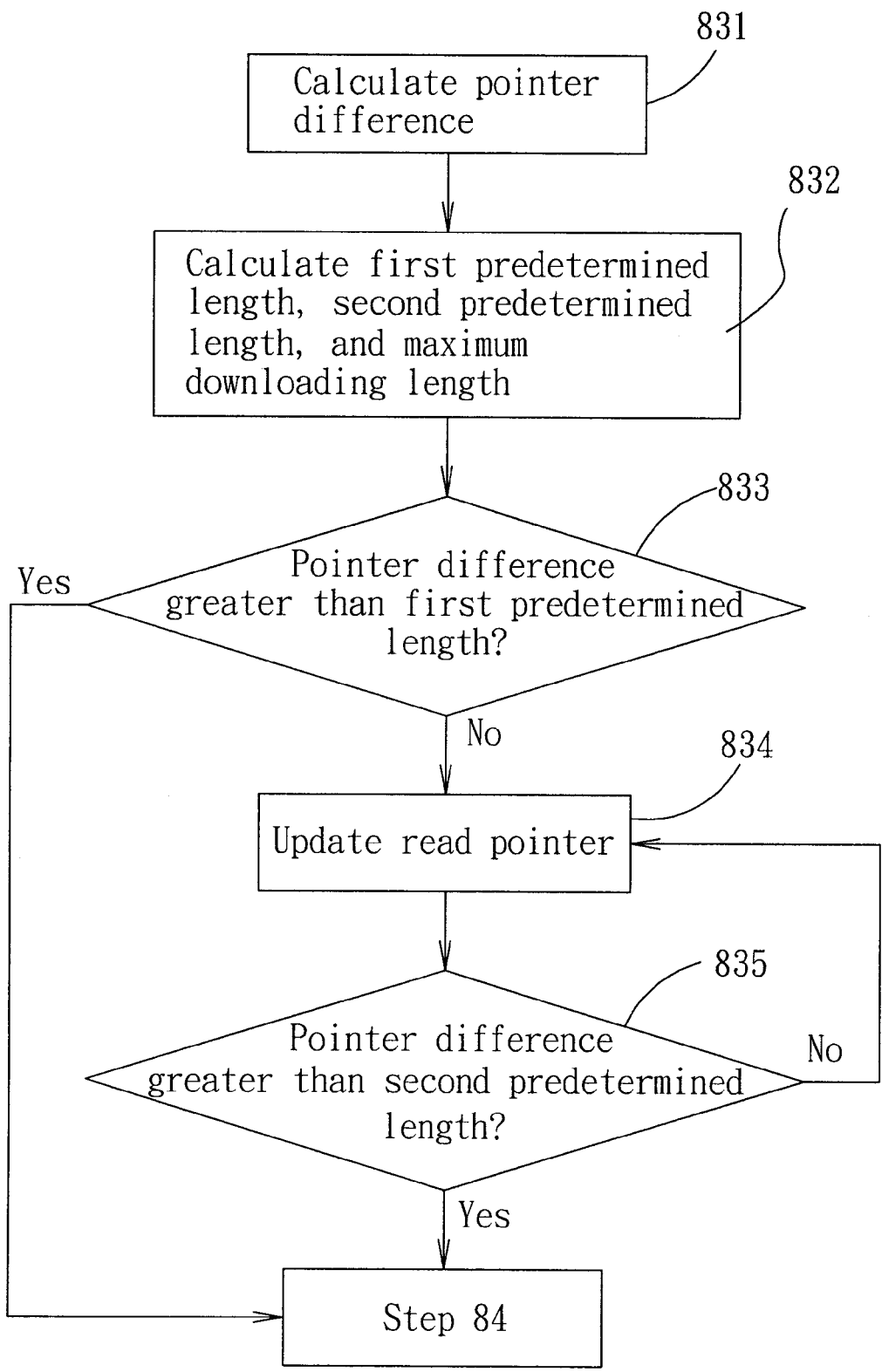
FIG. 4 is a flowchart of sub-steps involved in step 83 of FIG. 3.

Step 83 has the following sub-steps, as shown in FIG. 4.

In sub-step 831, the pointer difference calculator 41 calculates a distance between the write pointer and the read pointer to there by obtain a pointer difference.

In sub-step 832, the predetermined length calculator 42 receives the retransmit length (B), which is requested for retransmission when a collision occurs, and the guard band length (G), which may be a positive integer or zero, and sums the retransmit length (B) and the guard band length (G) to obtain the first predetermined length. The guard band is used to provide an optional safety distance between the write pointer and the read pointer.

In the preferred embodiment, in order to prevent the data access device 100 from downloading packet data too frequently, the predetermined length calculator 42 may further add the threshold limit value to the first predetermined length to obtain the second predetermined length, as described above. The threshold limit value may be zero. In some embodiments, the effect of a value of zero for the threshold limit value may be obtained by omitting the design associated with the second predetermined length, i.e., by omitting the second comparator (CMP2), the second AND gate (AND2), and the second multiplexer (MUX2), omitting the use of the second set value (SET_B) and the signal of the second predetermined length output by the predetermined length calculator 42, and directly transmitting the output of the first multiplexer (MUX1) to the register (FF).

In sub-step 832, the predetermined length calculator 42 further receives the pointer difference, and subtracts the first predetermined length from the pointer difference to obtain a maximum downloading length, which indicates a maximum data amount that the DMA engine 5 can download.

In sub-step 833, the first comparator (CMP1) determines whether the pointer difference is greater than the first predetermined length. If so, then the previous download status indication (0 value) is transmitted to the register (FF) through the first multiplexer (MUX1) and the second multiplexer (MUX2), such that the register (FF) maintains the 0 value of the download status indication (i.e., maintains the download status indication in the state enabling downloading), after which the flow proceeds to step 84.

If, on the other hand, the pointer difference is not greater than the first predetermined length in sub-step 833, the first set value (SET_A) (1 value) is transmitted to the register (FF) through the first multiplexer (MUX1) and the second multiplexer (MUX2), such that the register (FF) generates a download status indication of a 1 value, in which case the download status indication is in the state that does not enable downloading, after which the flow proceeds to sub-step 834.

In sub-step 834, since downloading is unable to be performed, the write pointer remains unchanged, and the read controller 2 is controlled by the write pointer so as to update the read pointer, thereby freeing-up more storable space in preparation for downloading.

Next, in sub-step 835, the second comparator (CMP2) determines if the pointer difference is greater than the second predetermined length. If not, the previous download status indication (1 value) is transmitted to the register (FF) through the first multiplexer (MUX1) and the second multiplexer (MUX2), such that the register (FF) maintains the 1 value of the download status indication (i.e., maintains the download status indication in the state that does not enable downloading) after which the flow returns to sub-step 834.

If, on the other hand, the pointer difference is larger than the second predetermined length in sub-step 835, the second set value (SET_B) (0 value) is transmitted to the register (FF) through the second multiplexer (MUX2), such that register (FF) generates a download status indication of a 0 value, in which case the download status indication is in the state that enables downloading, after which the flow proceeds to step 84.

Therefore, as is evident from the description of step 83, in the state where the download status indication enables downloading (i.e., the download status indication has a 0 value), the comparator 43 of the download timing controller 4 switches the download status indication into the state that does not enable downloading if the pointer difference is not greater than the first predetermined length. On the other hand, in the state where the download status indication does not enable downloading (i.e., the download status indication has a 1 value), the comparator 43 of the download timing controller 4 switches the download status indication into the state that enables downloading if the pointer difference is greater than the second predetermined length.

Furthermore, when the threshold limit value is zero (or design associated with the second predetermined length is omitted as described above), the first predetermined length is equal to the second predetermined length. In this case, if the pointer difference is larger than the first predetermined length, the download status indication is switched to 0 (i.e., the state that enables downloading), while if the pointer difference is not larger than the first predetermined length, the download status pointer is switched to 1 (i.e., the state that does not enable downloading).

In step 84, since the host 6 receives the access data request and the download status indication with a 0 value from the DMA engine 5, the host 6 outputs a write request (i.e., a control signal) having a plurality of prompts to the write controller 1 to update the write pointer. Each prompt of the write request corresponds to a respective one of the prompts of the request for processing, and is used to indicate that the transmit buffer 3 can perform processing of the data to be processed. The DMA engine 5 further determines the maximum downloading amount according to the maximum downloading length obtained by the predetermined length calculator 42 to thereby perform a data downloading operation based on the maximum downloading amount. Finally, the flow returns to step 81 of waiting for a prompt of a subsequent request for processing output by the host 6.

As shown in FIG. 2, the write controller 1 may include an accumulator (W1), a multiplexer (W2), and a register (W3). The multiplexer (W2) is controlled by a write request so as to select an output of the register (W3) or an output of the accumulator (W1) for transmission to the register (W3). However, the present invention is not limited to such a configuration of the write controller 1, and other configurations may be used that allow for control by the host 6 so as to output a write pointer.

It is to be noted that in the preferred embodiment described above, the DMA engine 5 is controlled by the access data request and the download status indication so as to output a write request through the host 6 to control the write controller 1. However, in another preferred embodiment, with reference to FIG. 5, the download status indication need not affect the operation of the DMA engine 5, and instead, an output of the host 6 passed through a DMA buffer controller 7, and the signal complementary to the download status indication are both used to determine output of the write request to the write controller 1 such that the write controller 1 updates the write pointer. Of course, other configurations and techniques may be used.

Furthermore, in some embodiments, the register (FF) of the comparator 43 may be omitted, in which case the structure of the comparator 43 must be altered to compensate for such an omission.

FIG. 6 is used to describe the relation of the write pointer and the read pointer to the transmit buffer 3 in the data access device 100 according to the preferred embodiments of the present invention. For purposes of the description to follow, it is assumed that the transmit buffer 3 has a storage space (S), an already-downloaded packet has a length (P), and a storage position of a packet being downloaded is connected to the rear of the packet already downloaded, and the packet being downloaded has an already-written length (C).

Using the read pointer to perform reading of the already-downloaded packet which has an already-read length (X), since a collision may occur, the retransmit length (B) and the guard band length (G) are predetermined with respect to a portion just read. On the other hand, the write pointer varies with the downloading progress of the packet being downloaded, and excluding an unread length (P−X) and a predetermined length (B+G) of an already-downloaded packet, and an already-written length (C) of a packet being downloaded, all of a remaining portion (S−((P−X)+(B+G)+C)) may be considered to be an overwrite region, that is, the maximum downloading length provided by the predetermined length calculator 42. At this time, the pointer difference between the write pointer and the read pointer is substantially equal to (S−((P−X)+C)).

When the data access device 100 is initially operated, there is no packet in the transmit buffer 3 that has already been downloaded (i.e., P=0), and hence, there is no already-read length (X), retransmit length (B), or guard band length (G). Therefore, the transmit buffer 3 has the largest storable space (S). Further, increases in the already-written length (C) may reduce an overwrite region (S−C).

In the data access device 100 and data access method for a communication system of the present invention described above, the download timing controller 4 suitably determines the timing of downloading data from the host 6 in accordance with the relation between the write pointer and the read pointer to thereby minimize the storage space required for the transmit buffer 3 and prevent a reduction in throughput for the data access device 100.

With this invention thus explained, it is apparent that numerous modifications and variations can be made without departing from the scope and spirit of this invention. It is therefore intended that this invention be limited only as indicated by the appended claims.

What is claimed is:

1. A data access device for a communication system, said data access device downloading data from a host and transmitting data to a network interface, said data access device comprising:
    a write controller being controlled by the host and outputting a write pointer;
    a read controller being controlled by the write pointer and outputting a read pointer;
    a download timing controller comparing the write pointer and the read pointer to determine a timing of downloading data from the host, said download timing controller including a pointer difference calculator and a comparator, said pointer difference calculator calculating a distance between the write pointer and the read pointer to obtain a pointer difference, said comparator outputting a download status indication according to the pointer difference and a first predetermined length in order to provide a basis for changing the write pointer; and
    a transmit buffer downloading data from the host according to the write pointer and transmitting data to the network interface according to the read pointer,
    wherein said download timing controller uses a predetermined retransmit length as the first predetermined length.

2. A data access device for a communication system, said data access device downloading data from a host and transmitting data to a network interface, said data access device comprising:
    a write controller being controlled by the host and outputting a write pointer;
    a read controller being controlled by the write pointer and outputting a read pointer;
    a download timing controller comparing the write pointer and the read pointer to determine a timing of downloading data from the host, said download timing controller including a pointer difference calculator and a comparator, said pointer difference calculator calculating a distance between the write pointer and the read pointer to obtain a pointer difference, said comparator outputting a download status indication according to the pointer difference and a first predetermined length in order to provide a basis for changing the write pointer; and
    a transmit buffer downloading data from the host according to the write pointer and transmitting data to the network interface according to the read pointer,
    wherein said download timing controller further includes a predetermined length calculator adding a predetermined retransmit length and a predetermined guard band length to obtain the first predetermined length.

3. A data access method for a communication system to be implemented by a data access device including a transmit buffer, the transmit buffer downloading data according to a write pointer and transmitting data according to a read pointer, said data access method comprising:
    calculating a distance between the write pointer and the read pointer to obtain a pointer difference, wherein the read pointer is outputted by a read controller being controlled by the write pointer;
    generating a download status indication according to the pointer difference and a first predetermined length; and
    changing the write pointer according to the download status indication,
    wherein the first predetermined length is equal to a predetermined retransmit length.

4. A data access method for a communication system to be implemented by a data access device including a transmit buffer, the transmit buffer downloading data according to a write pointer and transmitting data according to a read pointer, said data access method comprising:
    calculating a distance between the write pointer and the read pointer to obtain a pointer difference, wherein the read pointer is outputted by a read controller being controlled by the write pointer;
    generating a download status indication according to the pointer difference and a first predetermined length; and
    changing the write pointer according to the download status indication, wherein the first predetermined length is equal to a sum of a predetermined retransmit length and a predetermined guard band length.

5. A data access device for a network interface controller, said data access device transmitting data stored in a host to a network interface, said data access device comprising:
  a write controller determining a write pointer according to a control signal output by the host;
  a read controller determining a read pointer according to the write pointer;
  a download timing controller determining whether to receive data from the host according to the read pointer and the write pointer, said download timing controller including
    a pointer difference calculator calculating a distance between the write pointer and the read pointer to obtain a pointer difference, and
    a comparator outputting an indication according to the pointer difference and a predetermined length in order to instruct said data access device whether or not to receive data from the host; and
  a first-in-first-out (FIFO) buffer receiving data from the host according to the write pointer and transmitting data to the network interface according to the read pointer,
  wherein said download timing controller uses a predetermined retransmit length as the first predetermined length.

6. A data access device for a network interface controller, said data access device transmitting data stored in a host to a network interface, said data access device comprising:
  a write controller determining a write pointer according to a control signal output by the host;
  a read controller determining a read pointer according to the write pointer;
  a download timing controller determining whether to receive data from the host according to the read pointer and the write pointer, said download timing controller including
    a pointer difference calculator calculating a distance between the write pointer and the read pointer to obtain a pointer difference, and
    a comparator outputting an indication according to the pointer difference and a predetermined length in order to instruct said data access device whether or not to receive data from the host; and
  a first-in-first-out (FIFO) buffer receiving data from the host according to the write pointer and transmitting data to the network interface according to the read pointer,
  wherein said download timing controller further includes a predetermined length calculator adding a predetermined retransmit length and a predetermined guard band length to obtain the first predetermined length.

* * * * *